Jan. 21, 1941.　　　S. A. DEBNAM　　　2,229,372
LISTER WITH DAMMING AND SEEDING ATTACHMENT
Filed March 15, 1940　　　2 Sheets-Sheet 1
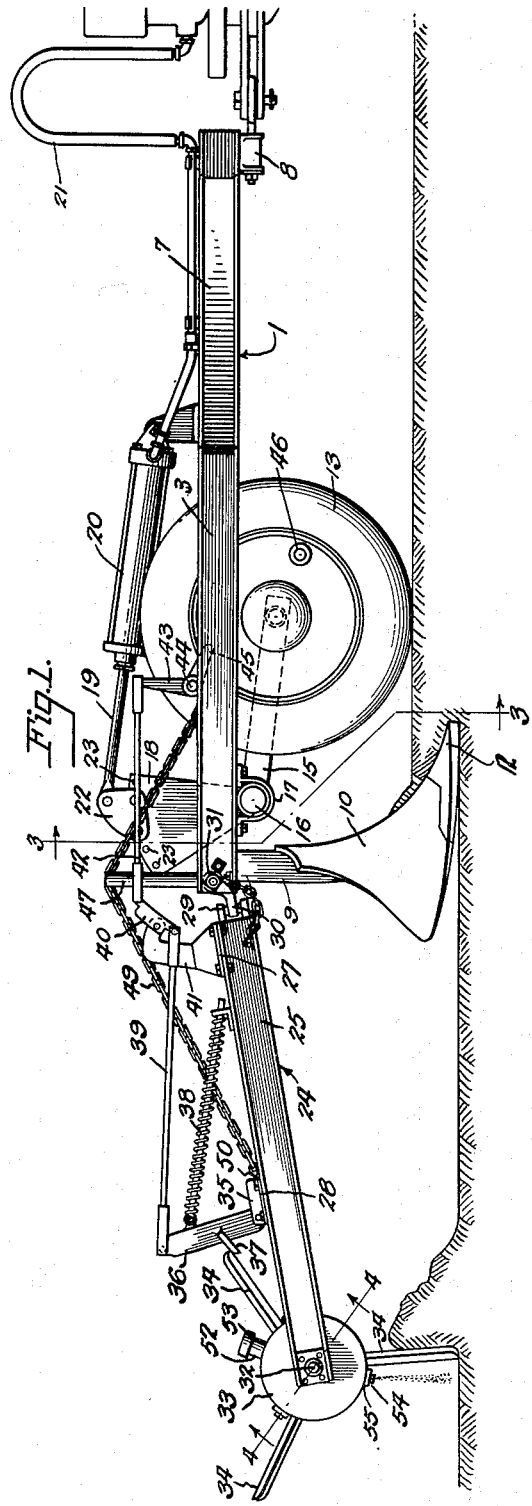
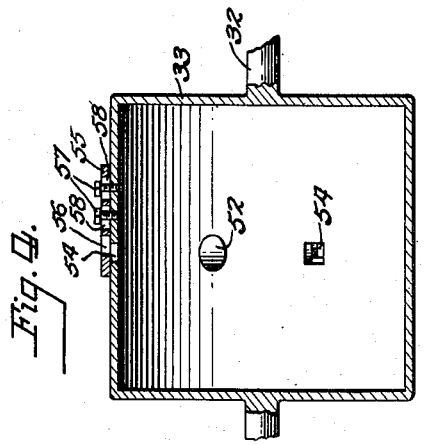
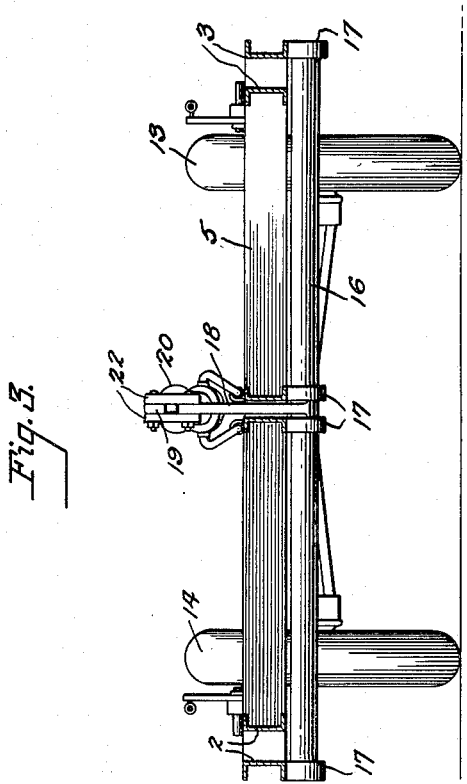
Inventor
S. A. Debnam
By Mason Fenwick & Lawrence
Attorneys

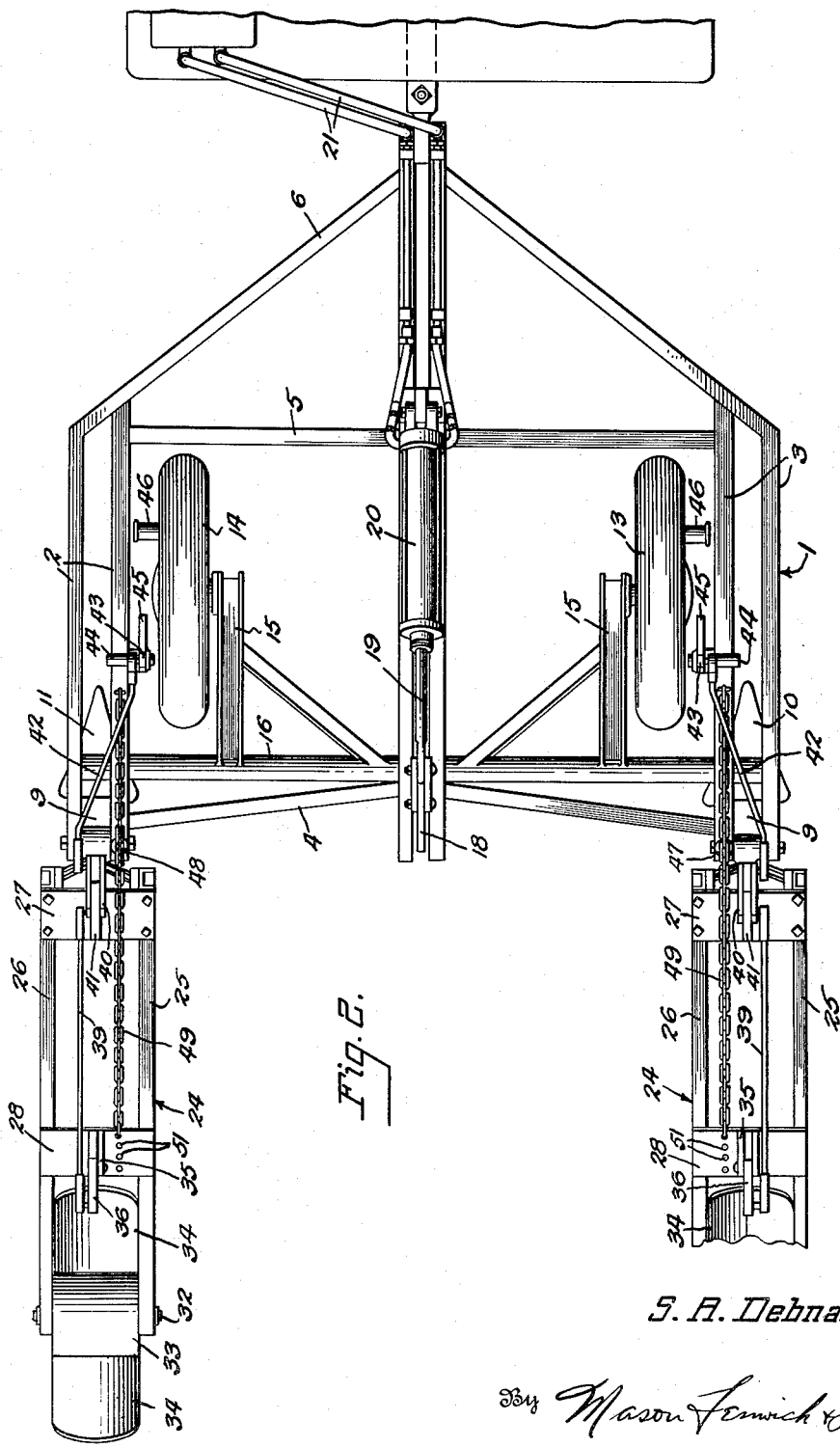

Patented Jan. 21, 1941

2,229,372

UNITED STATES PATENT OFFICE 2,229,372

LISTER WITH DAMMING AND SEEDING ATTACHMENT

Steven A. Debnam, Midland, Tex.

Application March 15, 1940, Serial No. 324,204

6 Claims. (Cl. 111—83)

This invention relates to a combined lister and damming attachment, especially designed for the cultivation of pasture lands in regions of scant rainfall, to prevent the water from quickly draining from the land, and to prevent soil erosion from heavy rainfalls.

One of the objects of the invention is to provide a combined seeder and dammer to be drawn by the lister and work in the furrow produced by the lister.

Another object of the invention is the provision of a seeder and dammer of the rotary scraper type, in which the dam depositing interludes in the rotation of the dammer and the periods of interruption in the dropping of the seeds are automatically controlled by means on the lister.

Still another object of the invention is to provide a combined rotary seeder and dammer, in which the duration of the seed dropping period is controlled through the phase of rotation of the apparatus, and correlated with the damming blades or scrapers so as to interrupt the flow of seed while the scraper is going over the dam.

Other objects of the invention will appear as a preferred and practical embodiment thereof proceeds.

In the drawings which accompany and form a part of the following specification, and throughout the several figures of which the same characters of reference have been employed to designate identical parts:

Figure 1 is a side elevation of apparatus embodying the principles of the invention;

Figure 2 is a plan view of the same;

Figure 3 is a cross-section taken along the line 3—3 of Figure 1; and

Figure 4 is an axial section taken along the line 4—4 of Figure 1.

Before continuing with a description in detail of the several figures, it may be stated that combined listers with damming attachments are known, in which the seeder is carried by the lister and deposits the seed in advance of the dammer. This is obviously an unscientific and uneconomical manner of distributing the seed, for a certain portion of the seed are inevitably scraped together by the dammer, disturbing the uniform distribution of the seed.

Referring to the figures, the numeral 1 represents the lister as a whole, which consists of a frame having longitudinal members 2 and 3 with transverse members 4 and 5 and forwardly inclined members 6 and 7 which come together in the median line of the frame and carry a hitch by means of which a lister is connected to the tractor. As is indicated in Figure 1, the frame members are preferably of channel section. The rear transverse member 4 has plow supports 9 extending downwardly therefrom, and carrying plows 10 and 11. The plow points may be of any desirable shape, but are here shown as having subsoil or rooter points 12 adapting them to dig into the bottom of the furrow.

The lister is supported upon exposed traction wheels 13 and 14 carried at the outer ends of cantilever brackets 15 which are fixedly secured to a shaft 16, the latter being carried in suitable bearings 17 secured to flanges on the under side of the side members 2.

The depth of the furrow is varied by partial rotation of the shaft 16 which swings the brackets 15 and raises or lowers the traction wheels 13 and 14 relative to the lister frame.

Rotation of the shaft 16 is accomplished by means of a sector-shaped plate 18 fixed to said shaft, and connected to a piston or plunger rod 19 of a hydraulic motor 20 pivotally mounted on the lister and deriving its power through a flexible connection 21 from a compressor carried by the tractor. The connection between the piston rod 19 and the sector 18 may be of any desired form and construction, but is here shown as being a triangular link 22 pivoted to the piston rod 19 and selectively secured in a rigid manner in any of a plurality of holes 23 formed near the circumferential periphery of the sector plate 18. When the plunger rod moves to the right, the traction wheels are depressed; when the plunger rod moves to the left, the traction wheels are elevated.

In the illustrated embodiment of the invention only two plows are shown, but obviously any number of plows might be provided, without altering the nature and scope of the invention.

A separate seeder and dammer attachment is employed for each plow. Said dammer attachments are as a whole, designated by the reference character 24. Each consists of longitudinal frame members 25 and 26 connected in spaced relation by transverse plates 27 and 28. At its forward end, each seeder and dammer attachment has a vertical clevis pin 29 passing through a clevis 30 which is swingably mounted about a horizontal pin 31 carried by the lister. At the opposite end, each lister is provided with a shaft 32 suitably journaled between the ends of the longitudinal frame members 25 and 26 and carrying a drum 33. Said drum has three blades or scrapers 34 extending radially at equal angular distances of 120°. The number and spacing of the scraper blades is, however, altogether immaterial to the invention. The seeder and dammer attachment is supported upon the scraper blades, the shape of which is substantially the same as that of the furrow produced by the plow, the object of the scraper blades being to scrape away some of the loose soil from the sides of the furrow and to deposit it at suitable intervals across the furrow, forming the dam. The scraper blades perform their scraping function when they are in a position substantially perpendicular to the furrow, and therefore, while the blades are performing their dirt collecting function, the drum must be held against rotation. This is accomplished by the following instrumentalities:

A lug 35 is mounted upon the transverse plate 28, carrying a swinging link 36 having a catch 37, the end of which may be extended into the circumferential path of the ends of the scraper blades so as to engage one of them and prevent the drum 33 from rotating. Normally, the swinging link 36 is biased by a compressed spring 38 in a direction to keep the catch 37 in the path of rotation of the scraper blades. The upper end of the swinging link 36 is pivotally connected to a rod 39 which in turn is pivotally connected to one end of a rocking lever 40 supported upon a fixed lug 41 mounted upon the transverse plate 27. The opposite end of the rocking lever 40 is pivotally connected to one end of a rod 42, the opposite end of which is connected to one end of a rocking lever 43. The last named rocking lever is pivoted at 44 to one of the longitudinal frame members of the lister. The opposite end 45 of the rocking lever 43 intersects the orbit of a pin 46 carried eccentrically by one of the traction wheels.

As the lister is drawn along the ground, rotation of the traction wheel causes the pin 46 to engage the end 45 of the rocking lever 43, swinging the link 36 in a clockwise direction against the compression of the spring, withdrawing the catch 37 from beneath the scraper blade 34 which it engages.

When the blade 34 is thus released, the drum 33 is free to turn, and the ground engaging blade 34 then ceases to scrape and rides freely over the mass of earth which it has scraped up in front of it, said mass being thus deposited as a dam across the furrow.

It will be understood that the rotation controlling mechanism above described is individual to each of the seeder and dammer attachments.

The lister is provided at its rear ends with upstanding fixed posts 47 and 48 which are notched at their upper ends in a longitudinal direction, each engaging the bight of a chain 49, one end of which is secured to the lister, while the other end is provided with a hook 50 selectively engageable with one of a plurality of holes 51 in the frame of the attachment. Normally, the chain will be hooked in the proper hole to enable the scraper blades to work at the proper depth. When it is desired that the seeder and dammer attachments shall be rendered inoperative, it may be lifted bodily from the furrow and held in elevated position by engaging the hook 50 with the rearmost of the holes 51, holding the attachment out of the ground.

The interior of the drum 33 constitutes a seed chamber which is filled through a hollow nipple 52 closed by a screw cap or other suitable means 53. The drum is provided close to each blade and on the trailing side thereof, with seed discharge apertures 54. The size of said apertures, and consequently, the rate of discharge of the seed, is regulated by means of a slidable plate 55 having an aperture 56 which may be placed to a greater or less extent into registry with the discharge aperture 54. Said plate is secured in any position of adjustment by means of studs 57 which pass through slots 58 formed in said plate.

From the above description of its structure, the mode of operation of the seeder and dammer attachment will be apparent. While one of the blades 34 is held by the catch 37, the ground engaging blade 34 will move longitudinally in the furrow under the pull of the lister, pushing in front of it the earth scraped from the sides of the furrow. At this time, one of the seed discharge apertures 54 is in a downward position, permitting the seed to be sprinkled in the furrow behind the scraping blade. When finally the catch 37 is tripped by the pin 46 on the lister wheel, the drum 33 will freely rotate, the ground engaging blade 34 then tilting upward in a clockwise direction over the mass of earth which lies in front of it, said earth being thus deposited as a dam across the furrow. The seed discharge aperture 54 will at the same time be moved in a clockwise direction to a horizontal position in which the discharge of seed will be interrupted. On the advance side of the dam the blade 34 which was previously engaged by the catch 37, will descend into the furrow and start its scraping operation just as soon as the next succeeding blade 34 has been engaged by the catch 37. The point at which the blade 34 will contact the furrow on the advance side of the dam depends upon the speed of the lister. Just as soon as the blade 34 engages the furrow, the seed discharging aperture 54 which lies close to its trailing side will begin to discharge seed into the furrow.

It will be readily understood that since the seed are discharged at the trailing side of the scraping blade they will not be disturbed by the dam forming operation, and it will be understood also that as the discharge of seed is automatically cut off while the attachment is hurdling the dam, no seed will be wasted on top of the dam.

While I have in the above description disclosed what I believe to be a preferred and practical embodiment of my invention, it will be understood to those skilled in the art that the specific details of construction as shown and described are by way of example, and not to be construed as limiting the scope of the invention defined in the appended claims.

What I claim as my invention is:

1. In combination with a lister, a damming attachment coupled to the lister having a blade working in the furrow produced by the lister, by intermittent scraping action building up dams across said furrow, and seeding means having its discharge to the rear of said blade, working synchronously with said blade for dropping seeds solely during the scraping periods of said blade.

2. In combination with a lister, a damming attachment coupled to said lister, said attachment including an intermittently rotatable unit having blades adapted to work successively in the furrow produced by the lister, building up dams across said furrow by intermittent scraping action, and seeding means having its discharge to the rear of said blade, working synchronously with said blade for dropping seeds solely during the scraping periods of said blade.

3. In combination with a lister, a damming attachment coupled to the lister having a rotary blade unit with projecting blades adapted successively to engage the furrow produced by the lister for scraping the sides of said furrow collecting earth for building up dams across said furrow, a retractable stop normally in the path of rotation of said unit positioned to engage a blade when another blade assumes its working position in the furrow, for inhibiting rotation of said working blade during its scraping period, means responsive to the tractive movement of said lister for withdrawing said stop periodically whereby upon rotation of said unit said working blade rotates out of the furrow over the dam, while the succeeding blade enters said furrow on the advance side of the dam, said unit including a seed hopper with discharge apertures adjacent each blade on the trailing side thereof for dropping seed into the furrow behind the working blade while it is in its working phase.

4. In combination with a lister, a damming attachment coupled to the lister having a rotary unit with projecting blades adapted successively to engage the furrow produced by the lister, for scraping the sides of the furrow collecting earth for building up dams across said furrow, said unit including a drum rotatable about a horizontal axis from which said blades radiate, said drum constituting a seed hopper, said drum having seed discharging apertures adjacent each blade on the trailing side thereof for dropping seed into the furrow behind each blade while it is in its working phase, a retractable stop normally in the path of rotation of said unit positioned to engage a blade when another blade reaches its working position in the furrow, for inhibiting rotation of said working blade during its scraping period, and means responsive to the tractive movement of said lister for withdrawing said stop periodically whereby upon rotation of said unit said working blade rotates out of the furrow.

5. In combination with a lister, a damming attachment coupled to the lister having a rotary unit with projecting blades adapted successively to engage the furrow produced by the lister for scraping the sides of said furrow collecting earth for building up dams across said furrow, a retractable stop normally in the path of rotation of said unit positioned to engage a blade when another blade is at the beginning of its working position in the furrow, for inhibiting rotation of said working blade during its scraping period, means responsive to the tractive movement of said lister for withdrawing said stop vertically whereby said working blade rotates out of the furrow over the dam while the succeeding blade enters said furrow on the advance side of the dam, said unit including a seed hopper with discharge apertures adjacent each blade on the trailing side thereof the flow of seed from said discharge apertures being controlled by the angular position assumed by said apertures upon rotation of said unit.

6. Damming and seeding attachment for listers comprising a frame having means at one end for hitching it to a lister and having a rotary unit at its opposite end comprising a hollow drum constituting a seed hopper, blades radiating from said seed hopper, said blades being adapted to successively enter a furrow produced by the lister and to scrape up earth from the sides of said furrow and deposit it intermittently in the form of dams across said furrow, said attachment including a retractable stop normally in the path of rotation of said unit, positioned to engage a blade when another blade reaches its working position in the furrow for inhibiting rotation of said working blade during its scraping period, means responsive to the tractive movement of the apparatus for withdrawing said stop periodically whereby upon rotation of said unit said working blade rotates out of the furrow over the dam, while the succeeding blade enters said furrow on the advance side of the dam, said seed hopper having a discharge aperture adjacent each blade on the trailing side thereof for dropping seed into the furrow behind the blade which is in its working phase.

STEVEN A. DEBNAM.